United States Patent [19]

Bettcher

[11] 4,170,063

[45] Oct. 9, 1979

[54] KNIFE WITH REMOVABLE BLADE HOUSING

[75] Inventor: Louis A. Bettcher, Amherst, Ohio

[73] Assignee: Bettcher Industries, Inc., Birmingham, Ohio

[21] Appl. No.: 960,965

[22] Filed: Nov. 15, 1978

Related U.S. Application Data

[63] Continuation-in-part of Ser. No. 924,914, Jul. 17, 1978.

[51] Int. Cl.[2] .................. A22C 17/04; A22C 17/12

[52] U.S. Cl. .................. 30/276

[58] Field of Search .................. 30/276, 286, 240, 316, 30/347

[56] References Cited

U.S. PATENT DOCUMENTS

| | | | |
|---|---|---|---|
| 3,024,532 | 3/1962 | Bettcher | 30/276 |
| 3,269,010 | 8/1966 | Bettcher | 30/276 |
| 3,461,557 | 8/1969 | Behring | 30/276 |
| 3,605,841 | 9/1971 | Lindstrom | 30/276 |
| 3,688,403 | 9/1972 | Bettcher | 30/276 |
| 3,852,882 | 12/1974 | Bettcher | 30/276 |

*Primary Examiner*—Jimmy C. Peters
*Attorney, Agent, or Firm*—Watts, Hoffmann, Fisher & Heinke, Co.

[57] ABSTRACT

A hand knife having a ring-like rotary blade the diameter of which is considerably greater than its axial length rotated by a motor in a handle extending normal to the axis of rotation of the blade. The blade of the knife is rotatably supported in a housing that surrounds a part of it and which can be removed for sharpening or placement of the blade by merely loosening a pair of threaded fasteners.

2 Claims, 4 Drawing Figures

KNIFE WITH REMOVABLE BLADE HOUSING

CROSS-REFERENCE TO RELATED CASES

This application is a Continuation-in-Part of co-pending application Ser. No. 924,914 filed July 17, 1978, entitled BONING KNIFE.

BACKGROUND OF THE INVENTION

1. Field of Invention

The invention relates to hand knives having power driven ring-like rotary cutting blades used primarily in the packing house, and meat distribution industries, for trimming and slicing meat and for removing meat from bones.

2. Description of the Prior Art

Hand knives having power driven, ring-like rotary blades have been used for some time in packing houses, meat distribution or wholesale houses and the like, for trimming and slicing meat and for removing meat particles from bones. These knives are commonly referred to as trimming and slicing knives and boning knives. Two such prior art knives are disclosed in U.S. Pat. No. 3,852,882. The ring-like blades of such knives are of relatively small diameter and dull after relatively short usage typically two or three hours and are difficult to sharpen. While sharpeners are available for sharpening such knives without removing the blade from the knife, the blades are generally removed from the knives for sharpening. Because of the relatively small sizes of the parts involved, removal and replacement of the blades has been a tedious and time consuming operation. This is especially true as the operation is performed at the locations where the knives are used, that is, in packing houses and the like, and the parts are typically wet and greasy.

SUMMARY OF THE INVENTION

The invention provides a novel and improved hand knife, of the character referred to having a power driven ring-like blade rotatably supported in a housing with the cutting edge of the blade projecting from one end of the housing which housing is detachably connected to the handle assembly by headed and threaded fasteners, which knife is light in weight and readily manipulated by an operator, and from which the blade can be readily removed and replaced with minimum inconvenience and delay.

The aforementioned objects of this invention are accomplished by providing the blade supporting housing with apertures through which the threaded housing securing fasteners extend that open into the end of the housing remote from the end thereof from which the cutting edge of the blade projects.

Further objects and advantages of the invention will be hereinafter referred to and/or be apparent from the following description of the preferred embodiment of the invention.

DESCRIPTION OF THE PREFERRED EMBODIMENTS

Figure 1:
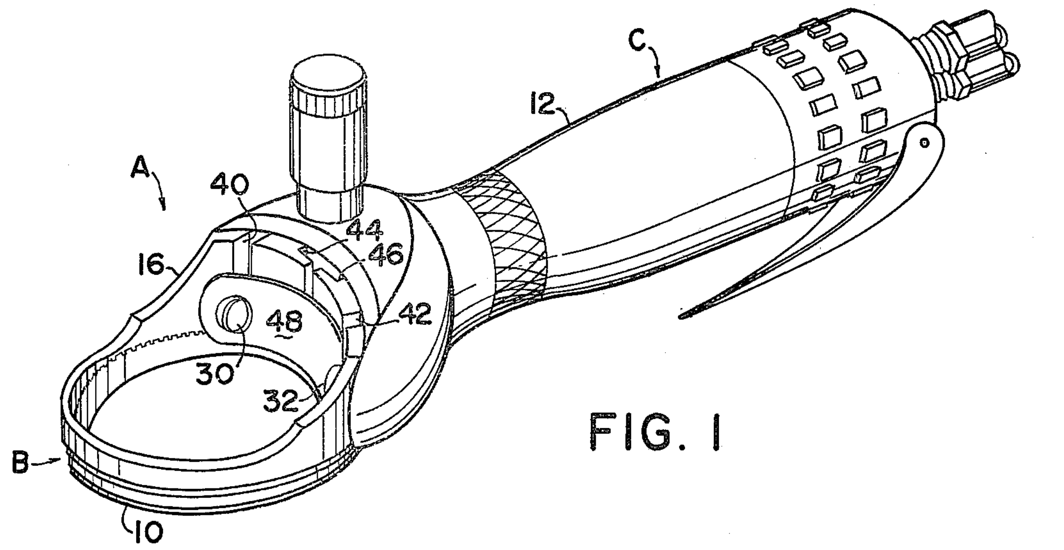
FIG. 1 is a perspective view of a knife embodying the invention.

The knife shown in the drawings and designated generally by the reference character A comprises an annular ring-like blade B of relatively short axial length having a peripheral cutting edge 10 at one end and supported for rotation in a frame assembly C. The knife A is generally similar to that shown in FIGS. 1 to 4 of the aforementioned U.S. Pat. No. 3,852,882 and is typically referred to as "boning" knife, that is, one intended primarily for removing meat from bones. It is to be understood that the invention is equally applicable to other rotary bladed knives including "so-called" trimming and slicing knives such as shown in FIGS. 5 and 6 of U.S. Pat. No. 3,852,882. The frame assembly C comprises a tubular handle member 12 having a concave arcuate surface 14 at one end and a split ring-shaped blade supporting member or housing 16, the split 18 of which is adjacent to the center of the arcuate surface 14 of the handle member 12. The ring-shaped blade B is of short axial length, is rotatably supported in the blade housing member 16 which surrounds the upper part of the blade with the cutting edge 10 of the blade extending from one end of the member 16. The other end of the blade B is provided with gear teeth 20. The blade B is rotatably supported in the blade housing 16 by an external flange 22 that engages in an internal groove 24 in the blade housing 16. The blade B is rotated by a gear 26 located at the arcuate surface of the handle member and in mesh with the gear teeth 20 on the blade B. The gear 26 may be rotatably supported in the handle member 12 and driven in the same manner, for example, in the same manner as the corresponding gear of the knife shown in FIGS. 1 to 4 of U.S. Pat. No. 3,852,882, the disclosure of which is incorporated herein by reference.

The blade supporting housing member 16 and the blade B carried thereby are detachably connected to the handle member 12 by two headed and threaded fasteners 30, 32 at opposite sides of the split 18 in the member 16 which fasteners are threaded into suitably tapped apertures 34 opening into the arcuate surface 14 of the handle member. The member 16 is of short axial length being less than half that of the blade B and has portions or parts 36, 38 at opposite sides of the split 18 of greater axial length, about twice that of the remainder of the member 16. The parts 36, 38 extend in the direction away from the cutting edge of the blade and have slots 40, 42 opening into the ends thereof opposite to the end of the member 16 from which the cutting edge 10 of the blade B projects. The shanks of the fasteners 30, 32 for a short distance adjacent to the heads of the fasteners are reduced in the diameter to the root diameter of the threads of the fasteners. The portions of the shank of the fasteners of reduced diameter adjacent to their heads extend through the slots 40, 42 in the member 16 at the opposite sides of the split 18. Apertures 44, 46 in the ends of the member 16 at the split 18 provide clearance for the gear 26. A lock member 48 is provided underneath the heads of the fasteners to resist their unscrewing during use of the knife.

The construction of the member 16 and its manner of connection to the handle member 12 permits the member 16 and the blade B carried thereby to be removed from the handle assembly by merely loosening the fasteners 30, 32 and allowing the member 16 and blade B carried thereby to drop out of the handle assembly as the knife is viewed in the drawing. Once the assembled parts 16, B are removed from the other parts of the knife the blade B can be easily removed from the member 16 as by extending the member 16 which in the depicted knife is split. The blade can then be conveniently sharpened and replaced or replaced by a different sharp blade thus reducing the "down time" for the knife, that is the time the knife is not usable. The most important advantage of the present knife is that it is not necessary to remove the fasteners 30, 32 from the handle assembly to replace a blade.

The major part of the blade B below the split ring member 16, in which it is carried, and in the depicted knife is approximately of uniform wall thickness and frusto-conical in shape, diverging outwardly towards its lower end as viewed in the drawings. The exterior part 50 of the lower end of the blade B at the cutting edge 10 diverges outwardly in an upwardly direction to a point where it intersects a substantially cylindrical exterior part 52. In resharpening the blade the exterior surface 50 adjacent the cutting edge 10 is ground away and the substantially cylindrical surface 52 adjacent thereto makes it possible to grind the blade without materially changing the configuration or area of the exterior blade surface adjacent the cutting edge thus making it possible to maintain a uniform blade cutting action throughout the life of the knife. The longer the part 52 is the more the blade can be sharpened and the life thereof thus extended.

Figure 2:
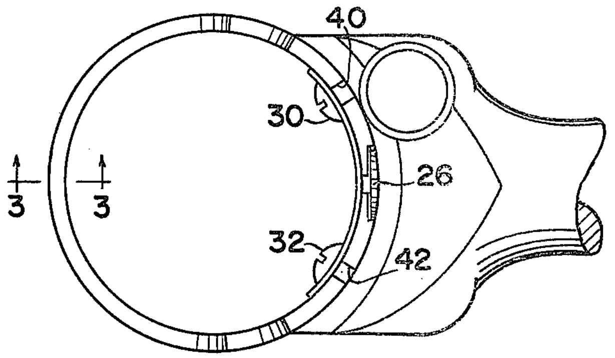
FIG. 2 is a fragmentary plan view of the knife shown in FIG. 1.
Figure 3:
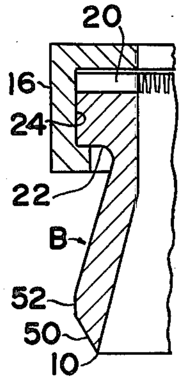
FIG. 3 is a sectional view approximately on the line 3—3 of FIG. 2.
Figure 4:
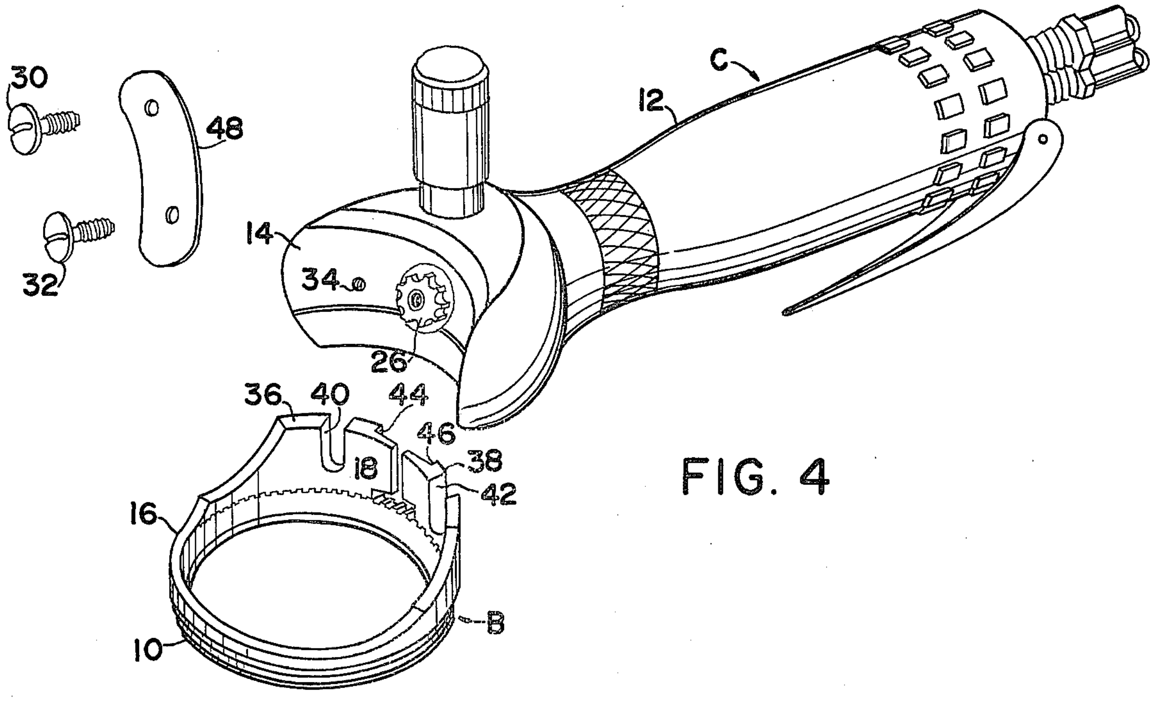
FIG. 4 is a perspective exploded view of the knife shown in FIG. 1.

The depicted knife is designed for use by a right-handed operator. The blade rotates in a counter clockwise direction as viewed in FIG. 2 and when the knife is in use that part of the blade which is in the lower right-hand quadrant as the knife is viewed in FIG. 2, is the part which typically performs most of the cutting operation.

From the foregoing description of the preferred embodiment of the invention shown in the drawings it will be apparent that the object hereinbefore enumerated and others have been accomplished and that there has been provided a novel and improved knife especially designed for the meat processing industries having a power driven, rotatable blade of short axial length supported in a ring-like member connected to a handle assembly in such a manner that the ring-like member and blade can be removed from the handle assembly for replacement of the blade without the removal of any other parts. This is particularly advantageous because the knife is typically used in a location where it is wet and greasy thus making it inconvenient to remove and replace threaded fasteners which are necessarily relatively small in size.

While the preferred embodiment has been shown and described in considerable detail, it is to be understood that the invention is not limited to the construction shown, but that it may be otherwise embodied and it is the intention to hereby cover all such embodiments which come within the scope of the appended claims.

What is claimed is:

1. A hand knife comprising a handle assembly having a concave arcuate surface at one end with two tapped apertures opening thereinto, a drive gear adjacent to the arcuate surface of the handle assembly between the tapped apertures opening thereinto and rotatably supported in the handle assembly, a ring-like blade housing member of short axial length having portions of greater axial length at said arcuate surface of the handle assembly than the remainder thereof and having through apertures in the portions of greater axial length, headed and threaded fasteners extending through the apertures in the ring-like member and threaded into the tapped aperture in the handle assembly detachably securing the ring-like blade housing member to the handle assembly, a ring-like blade member rotatably supported in the ring-like blade housing member and having a cutting edge at one end projecting from the ring-like blade housing member and gear teeth at its opposite end in mesh with the drive gear, characterized by the apertures in the ring-like blade housing member being slots opening into the end of the ring-like blade housing member opposite to the end from which the cutting edge of the blade projects, whereby the ring-like blade housing member and the blade carried thereby can be removed from the handle assembly without removing from the handle the screws connecting the ring-like blade housing member to the handle assembly.

2. As an article of commerce, a split ring-like blade housing member of short axial length having parts of increased axial length extending from one end thereof, axial extending slots in the parts of said split-ring like housing member of increased axial length opening into the extending ends thereof and an annular groove in the interior of said split ring member for the reception of an exterior flange of a blade member rotatably carried thereby.

* * * * *